Patented June 23, 1953

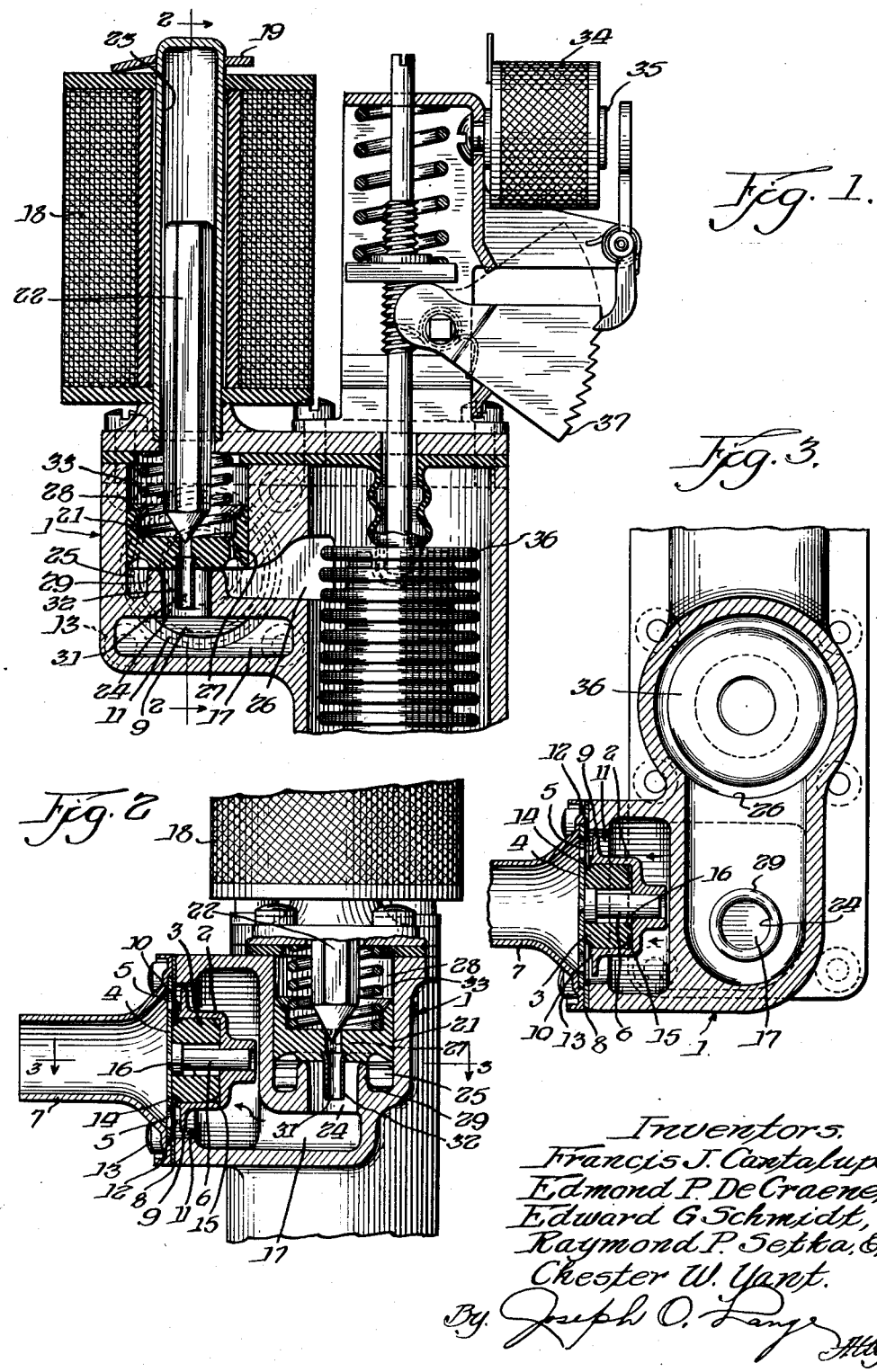

2,642,896

UNITED STATES PATENT OFFICE 2,642,896

FLOW CONTROL DEVICE

Francis J. Cantalupo, Chicago, Edmond P. De Craene, Westchester, Edward G. Schmidt, Western Springs, Chester W. Yant, Maywood, and Raymond P. Setka, Chicago, Ill., assignors to Crane Co., Chicago, Ill., a corporation of Illinois Original application December 9, 1947, Serial No. 790,638, now Patent No. 2,548,516, dated April 10, 1951. Divided and this application April 7, 1949, Serial No. 86,036

4 Claims. (Cl. 138—45)

This invention relates to a flow control device, and more specifically, it is a divisional application of our co-pending application, Serial No. 790,638, filed December 9, 1947, now identified as U. S. Patent No. 2,548,516, granted April 10, 1951.

In connection with automatic washing machines and the like, it is desirable to provide for flow control of the mixed water into the machine with a relatively fine response, and yet one which may be made cheaply and is easily replaceable or repaired whenever necessary.

A further object is to provide for a flow control device in which durability of construction and substantial guiding are important features.

Other objects and advantages will become more readily apparent upon proceeding with the specification, read in light of the accompanying drawings, in which Fig. 1 is a fragmentary sectional assembly view of a valve embodying our invention.

Fig. 2 is a fragmentary sectional view of a valve with the novel flow control device, taken on the line 2—2 of Fig. 1.

Fig. 3 is a fragmentary sectional view taken on the line 3—3 of Fig. 2.

Similar reference numerals refer to similar parts throughout the several figures.

Referring to Fig. 2, in connection with controlling the rate of flow of the water as it passes from the stop valve, generally designated 1, and before discharging said water into the washing machine, a novel flow control valve is provided. Primarily, the latter valve consists of a rigid movable member or cage 2, as shown more clearly in Figs. 2 and 3, in which latter member a compressible or distortable rubber-like washer 3 is retained. Supporting in abutting relation said washer and in cooperation therewith, an orifice plate 4 is provided with a plurality of spaced-apart apertures 5 annularly arranged, the said plate preferably having an integral stem guide 6 extending within the washer 3 and the movable cage member 2. The orifice plate 4 is preferably positioned in fluid tight relation to the discharge pipe 7 by means of the gasket 8.

It should be understood that the described assembly acts similar to a check valve which, however, never actually closes tight for reasons hereinafter explained. The fluid flow moving in the direction of the arrow tends to force the cage 2 in a similar direction against the orifice plate 4, the washer 3 being compressible thereby acting as a spring, and thus allowing the flange 9 on the cage 2 to move limitly toward the plate 4 to thereby reduce the flow of water through the orifices 5.

It should, of course, be realized that such water flow occurs outside of the cage member 2 past the periphery of the flange 9 positioned within the cylindrical chamber or bore 11. The described assembly accordingly provides a check valve in which the rubber-like washer 3 functions as a spring. To prevent complete closure of the orifices 5 by the cage and flange 9 under pressure load conditions normally encountered, the cage 2 at its end portion immediately adjacent the plate 4 is provided with an annular projection or shoulder 10, which under high load conditions will contact the plate to keep the cage flange in spaced-apart relation to the plate and orifices 5. Thus, at all times flow therethrough is allowed, even when the washer 3 is under maximum compression. It will thus be apparent that the washer 3 will yield sufficiently, that is, it compresses or distorts to vary the annular gap at 12 between the flange 9 on the cage 2 and the orifice plate 4 inversely as the pressure increases in the inlet between the cage 2 and the plate 5. The stem 6 insures proper guiding of the cage 2 and prevents any tendency toward inaccurate or inconsistent flow control traceable to tipping or canting of the cage member 2 which might otherwise occur. The flange 9 on the cage member 2 cooperating with said stop shoulder 10 thus assures a minimum flow gap between the flange 9 and the respective annularly positioned orifices 5. The discharge pipe 7 is bolted to the body portion of the valve 1 by means of the machine screws 13 in leakproof relation as previously described by means of the gasket 8.

In connection with a more detailed description of the device, it has been found that the chamfered annular portions 14 and 15 provided on the rubber-like washer 3 assist materially in improving the performance of the latter member insofar as its compressibility is concerned. The latter improvement is also aided further by the provision for an annular space 16 between the guide stem 6 and the washer 3, thereby permitting predetermined deformation of the rubber-like washer 3 to obtain the desired control of flow from the outlet passage 17 leading from the valve casing 1.

It has been discovered in connection with selecting a suitable performing material for the resilient distortable washer member 3, that rubber or rubber-like material having a Shore hardness of 26 to 30–A provides the most satisfactory results, but this selection will of course vary with service conditions encountered.

It should, of course, be apparent that the above flow control embodiment shown and described is applicable to devices other than washing machine valves, and therefore, it is not the intent to limit ourselves to the specific form of flow control valve illustrated herein. The invention as set forth in the claims appended hereto may be embodied in a plurality of variable structures and forms without departing from the spirit of such claims.

As pointed out in the copending patent application referred to, the stop valve for admitting water into the chamber 17 may be solenoid operated, employing the actuating solenoid coil 18, shown more clearly in Figs. 1 and 2, the solenoid being retained in place by means of the member 19. A piston-shaped cup-like flexible disc or closure member 21 is employed, having the reciprocably movable armature 22 suitably mounted within the pressure-tight tube 23. Water enters the solenoid stop valve seat chamber 24 when the valve is open by means of the channel or passage 25 connected with the upper end of the bellows chamber, as indicated at 26, and as shown more clearly in Fig. 1. Line pressure is provided above and below the disc 21 by means of the passage 27, preferably adjacent the disc periphery so that line pressure will be permitted to enter the chamber 28 above the disc to balance the latter against pressure. A seat 29 is provided in the valve proper, preferably integral with the casing. The disc or closure member 21 employs the central passage 31 communicating with the eductor tube 32. The valve 21 is preferably spring loaded by means of the coil spring 33 to insure the prompt return to its seat. All of the above immediately described construction of the main valve, however, is a part of our invention described in our co-pending patent application prevously referred to, and therefore, it has not been deemed necessary to describe it at greater length. The usual timing controls by means of an electromagnet 34 and a tripper contact 35 may be used with the bellows 36, so that at the desired or predetermined time, the latch 37 may be tripped in the general washing cycle of the automatic washer. The latter mechanism is connected operatively to an electric timer (not shown) or else by means of a mechanical action provided by some common device (also not shown) connected with the automatic washing machine operating mechanism. Since the employment of the latter is not new, it is likewise not deemed necessary to describe these elements in greater detail, especially because they are not directly concerned with our instant invention.

We claim:

1. In a pressure actuated flow control device, the combination of a casing having a substantially cylindrical chamber, a movable rigid cup-shaped member arranged within said casing to provide a flow passage between said member and the walls of the chamber, a centrally guided resilient member telescopically received within the said rigid member, an orifice plate in said chamber positioned against said resilient member, the said rigid member having an annular flange and having stop means between the plate and flange to prevent complete closure of the orifice by the said movable member whereby the flow passage between said plate and said rigid member is established by the compression of the said guided resilient member in response to fluid pressure against the movable rigid member.

2. In a pressure actuated flow control device, a casing, a movable member therefor including a rigid cage member axially movable within said casing and a resilient member telescoped within the said rigid cage member, a stationary orifice plate in abutting relation to the said resilient member, the said cage having an outer flange defining a clearance between the casing and the cage member, means interposed between said plate and the cage member to prevent complete closure at the orifice between said plate and cage member, whereby the axial movement of the cage member in response to flow through the casing is determined by the compression of the said telescoped resilient member.

3. In a pressure actuated flow control device, a casing, a reciprocably movable cup shaped member within said casing having an outer peripheral portion in annular spaced-apart relation to the said casing to permit fluid flow therebetween, a resilient washer-like member carried by the said movable member, an orifice plate in abutting contact relation to the said resilient member, guide means cooperating with the said movable member and resilient member, the said resilient member having an outer end relieved annular chamfered portion adjacent the abutting contact with said orifice plate and an annular space between the guide means and its inner periphery whereby to provide for compressibility of said resilient member.

4. In pressure actuated flow control means, a casing with a chamber, a reciprocably movable cup-shaped member limitly movable within said chamber, the said movable member having an annular portion in predetermined spaced-apart relation to the walls of the chamber to permit fluid flow therewithin, an orifice plate defining an end limit of the said chamber, a resilient distortable member normally in abutting contact with at least a portion of the said orifice plate and telescopically receivable within the said movable cup-shaped member, the said movable member having an end projecting means for contact with said orifice plate upon a predetermined increase in pressure in said casing.

FRANCIS J. CANTALUPO.
EDMOND P. DE CRAENE.
EDWARD G. SCHMIDT.
CHESTER W. YANT.
RAYMOND P. SETKA.

References Cited in the file of this patent
UNITED STATES PATENTS

| Number | Name | Date |
|---|---|---|
| 1,890,497 | Dalgliesh | Dec. 13, 1932 |
| 2,468,385 | Voss | Apr. 26, 1949 |
| 2,489,542 | Rosenblum | Nov. 29, 1949 |